(No Model.)

A. T. FAY.
CONDUIT TROLLEY ARM.

No. 522,461. Patented July 3, 1894.

Witnesses.
O. E. Van Doren.

Inventor,
Albert T. Fay.
By Paul Merrwm
his Attorneys.

United States Patent Office.

ALBERT T. FAY, OF MINNEAPOLIS, MINNESOTA.

CONDUIT FOR TROLLEY-ARMS.

SPECIFICATION forming part of Letters Patent No. 522,461, dated July 3, 1894.

Application filed July 26, 1892. Renewed November 16, 1893. Serial No. 491,162. (No model.)

*To all whom it may concern:*

Be it known that I, ALBERT T. FAY, of Minneapolis, in the county of Hennepin and State of Minnesota, have invented certain new and useful Improvements in Trolley-Arms, of which the following is a specification.

My invention relates to improvements in trolley arms for electric street cars and in particular to trolley arms employed in connection with underground conduits.

The object of the invention is to provide in that part of the arm above the surface of the road a section of metal which is weaker than that composing the remainder of the arm whereby any considerable lateral movement of the car or the strain on the arm will cause the arm to part at that point leaving the trolley in the conduit and preventing the tearing up of the surface-plates belonging to the conduit, as well as all damage to any of the electrical apparatus upon the motor car.

To this end my invention consists in the combination with the fastening point upon the car, of a trolley arm extending therefrom and provided with a contact device, said arm provided at an intermediate point with a breakable section of metal weaker than that composing the remainder of the arm.

The invention consists further in various details of construction and in combinations all as hereinafter described and particularly pointed out in the claims.

The invention will be more readily understood by reference to the accompanying drawings, forming a part of this specification, in which—

Figure 1:
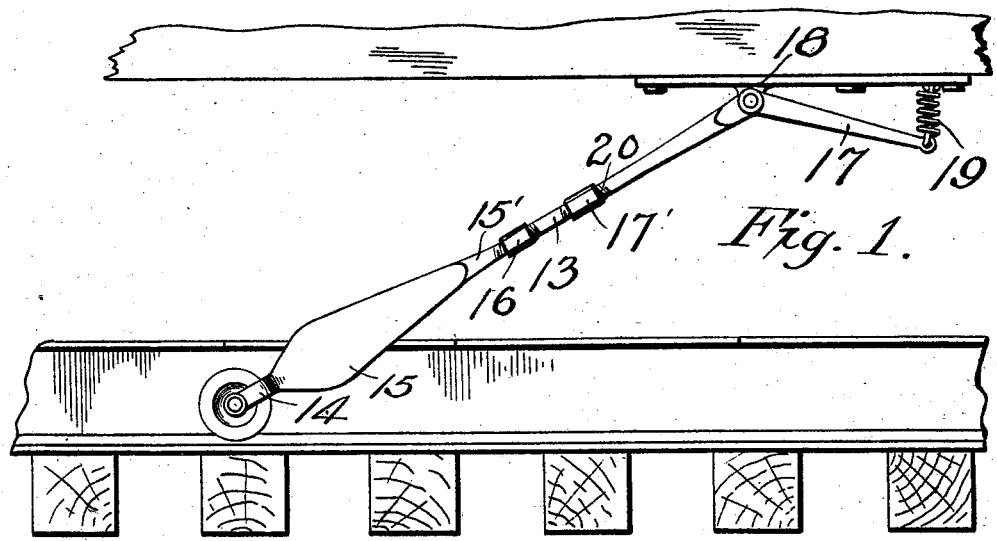
Figures 2, 3:
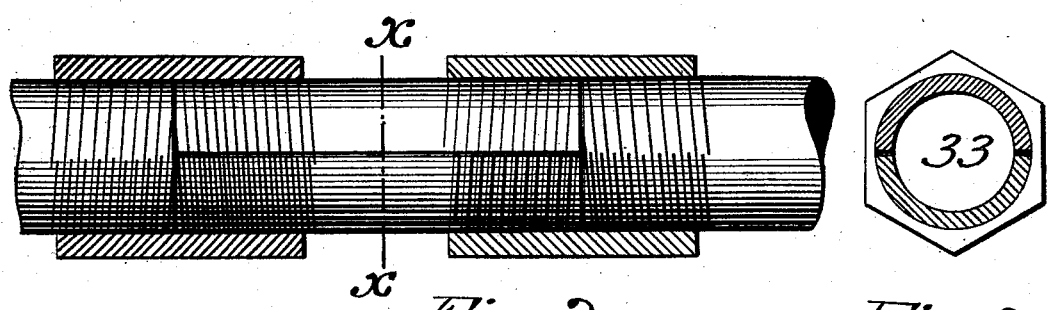

Figure 1 is a side elevation of a trolley arm embodying my invention and showing the same attached to a car and arranged to run in a conduit. Fig. 2 is an enlarged sectional detail of the breakable joint shown in Fig. 1. Fig. 3 is a cross section thereof on the line $x$—$x$ of Fig. 2, and Fig. 4 shows a modified form of my breakable section the same being partly in section.

A very common objection and difficulty presented in the running of electric cars by current supplied from underground conduits, is that in case a car is thrown from the track or lifted therefrom by an obstruction on the track, the trolley wheel usually secured in a yoke running within the conduit, is brought up against the surface plates with such force as to tear them from their moorings, or if these parts are especially strong, to do considerable damage to the electrical connections or apparatus carried on the car. To prevent such costly accidents I have devised a trolley for the use with a conduit, and of the construction shown in the drawings, where it will be seen that the trolley wheel which is arranged to run upon the conductor rail or wire is held in the yoke 14, formed on the lower end of the arm 15. This arm is in comparison to those formerly used, very thin, the necessary strength being gained by widening or flattening the arm as shown best in Fig. 1.

Beginning at a safe point above the top of the conduit the arm is reduced in breadth and brought down to a round shank 15', adapted to receive the internally threaded nipple 16. On the car is a bell-crank 17 pivoted on a block 18 and having its forward arm yieldingly attached to the under side of the car by the coiled spring 19; the other arm of the bell crank has a threaded end 20 to receive the second nipple 17'. These upper and lower parts of the trolley arm are formed of a strong metal, having considerable elasticity, and which under ordinary circumstances would effectually prevent any breakage of the arm. But in order to instantly disconnect the car from engagement with the lower end of the trolley device when subjected to an unusual strain I connect the bell crank arm and the lower part of the trolley arm with a short length made up of a weaker metal, say cast iron, the same being provided with a right and a left hand thread, so that it may be readily screwed into the adjoining threaded ends of the nipples 16 and 17'. In case the car jumps the track this weak or breakable section will instantly snap, owing to the unusual tension placed thereon, thereby allowing the trolley arm to drop down upon the conduit and preventing damage to the trolley wheel or to the conduit.

Figure 4:
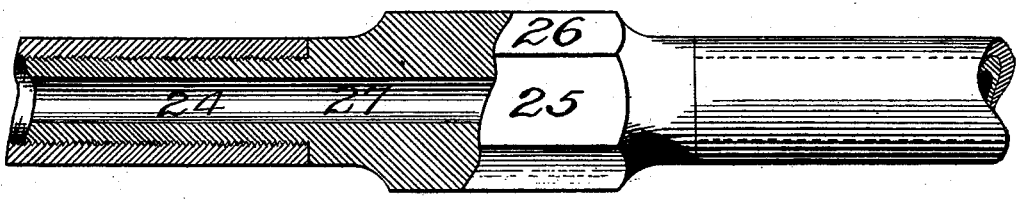

The breakable section may be formed in several ways, two of which are illustrated in Figs. 1 and 4. In the former it is made up of a split cast iron sleeve, having an opening 33 through which a small insulated copper wire may be passed between the lower part of the trolley arm and the bell crank, to furnish a better electrical connection than would be ordinarily formed by cast iron. In many cases it is possible to use a section of the form shown in Fig. 4 where the nipples are dispensed with and the adjoining ends of the trolley arm and the bell crank provided with interior threads adapted to receive the threaded shanks 24, of the section 25 which has the hexagonal part 26 to which a wrench may be applied for screwing the section in place. In this case, also, an opening 27 may be made through the cast iron section for a copper wire. In case there is any tendency of the breakable section to loosen locking nuts may be placed thereon to prevent its turning with respect to the trolley arm.

Having thus described my invention, I claim as new and desire to secure by Letters Patent—

1. The combination with a car, of the track for the same, an underground conduit provided with a surface slot a trolley arm having the thin flattened portion and the yoke to receive the trolley wheel, and a breakable section of weaker metal arranged between the top of the conduit and the car, substantially as described.

2. The combination with the car and the track therefor, of the underground conduit containing an electric conductor and having the surface plates forming the continuous slot, a trolley arm extending from said car into said conduit and provided with a contact device therein, and a breakable section 13 interposed in the trolley arm between the top of the conduit and the car, substantially as described.

3. The combination with the trolley yoke, of the trolley arm extending therefrom and arranged to be pivoted upon a car, said arm provided in two main parts having oppositely threaded approaching ends, and a section of breakable metal threaded and interposed between said approaching ends, the same being secured thereto by nipples 16 and 17' and composed of two hollow parts or pieces, substantially as described.

In testimony whereof I have hereunto set my hand this 22d day of July, A. D. 1892.

ALBERT T. FAY.

In presence of—
C. G. HAWLEY,
F. S. LYON.